United States Patent [19]
Loftus

[11] Patent Number: 4,737,709
[45] Date of Patent: Apr. 12, 1988

[54] APPARATUS FOR MEASURING AXIAL MOVEMENT OF A ROTATING MEMBER

[75] Inventor: Peter Loftus, Derby, England
[73] Assignee: Rolls-Royce plc, London, England
[21] Appl. No.: 896,208
[22] Filed: Aug. 14, 1986

[30] Foreign Application Priority Data

Oct. 2, 1985 [GB] United Kingdom ............... 8524287

[51] Int. Cl.$^4$ .................. G01B 7/14; H01F 17/00; H01F 27/28; G01R 33/00
[52] U.S. Cl. .................. 324/208; 324/226; 336/200; 336/232; 415/118
[58] Field of Search ....... 324/207, 208, 226, 239–243, 324/173, 174; 73/660; 415/118; 336/200, 206, 225, 232

[56] References Cited

U.S. PATENT DOCUMENTS

3,208,269 9/1965 Eccles et al. .................. 324/208 X

FOREIGN PATENT DOCUMENTS

| 3218508 | 5/1982 | Fed. Rep. of Germany | 324/208 |
| 2298082 | 9/1976 | France | 324/208 |
| 811669 | 4/1959 | United Kingdom | 324/208 |
| 1009979 | 11/1965 | United Kingdom . | |
| 1303994 | 1/1973 | United Kingdom . | |

OTHER PUBLICATIONS

Staheli W., Inductive Method for Measuring Rotor Blade Vibrations on Turbo-machines, *Sulzer Technical Revue*, vol. 57, No. 3, pp. 177–185, 1975.

*Primary Examiner*—Gerard R. Strecker
*Attorney, Agent, or Firm*—Cushman, Darby & Cushman

[57] ABSTRACT

A device for detecting axial movement of a rotating member, for example a compressor rotor of a gas turbine engine, comprises a conducting wire spaced radially from the rotating member, and a magnet carried by the rotating member passes in proximity to the conducting wire when the rotating member is rotating. The conducting wire has a first limb a second limb and a third limb extending with axial and circumferential components, the first and third limbs extending in the circumferentially opposite direction to the second limb to increase resolution between pulsed e.m.f.'s produced when the magnet crosses the limbs. The first, second and third limbs are each formed from a pair of parallel connected bars to produce positive and negative pulsed e.m.f.'s which form zero crossing points which are more easily detected. This enables operation at greater radial clearance or lower rotating speeds.

5 Claims, 3 Drawing Sheets

APPARATUS FOR MEASURING AXIAL MOVEMENT OF A ROTATING MEMBER

The present invention is concerned with apparatus for measuring axial movement of a rotating member, and in particular for measuring axial movement of rotor blades in a rotary machine, for example compressor blades of a gas turbine engine.

Rotating members often move axially besides rotating generally around their axis of rotation, and it is desireable to have an indication of the degree and direction of any axial movement of the rotating member.

One apparatus and method for detecting axial vibrations of a rotating member, as disclosed in British Pat. No. 1009979, has been to use a magnet positioned in the circumference of the rotating member, and a stationary conducting wire spaced radially from the rotating member. The conducting wire has been formed from a plurality of interconnected parallel bars slanting at 45° to the axis of rotation. As the magnet crosses in proximity to the conducting wire an e.m.f. pulse is produced in the wire, thus an alternating e.m.f. is produced of a certain frequency. Vibrations cause variation in the frequency of the e.m.f. produced by the magnet crossing the conducting wire.

A second apparatus and method for measuring axial movement of a rotating member, has been to use a magnet positioned in the circumference of the rotating member, and a stationary conducting wire spaced radially from the rotating member. The conducting wire has been formed from three bars, two bars extending parallel to each other in an axial direction and the third bar extending diagonally between the other two bars at 45° to form a Z shape. Again as the magnet crosses the conducting wire an e.m.f. pulse is produced in the wire. Axial movement of the rotating member causes the point at which the magnet crosses the third bar to vary and hence the position of e.m.f. pulse generated moves in time relative to the pulses from the first and second bars. The axial position of the magnet, rotating member, can be calculated by ratioing the time between the pulses from the first and third bars to the time between the pulses from the first and second bars and multiplying by a scaling factor equal to the width of the Z shape conducting wire.

This second apparatus is used in conjunction with an oscilloscope, but suffers from disadvantages in that the pulse from the third bar is difficult to detect, because the amplitudes of the pulses are not the same, and the resolution is not good. Also the apparatus becomes non linear at the edges of the bars where they interconnect because the pulses merge together.

The present invention seeks to provide a device for detecting axial movement of a rotating member in which the e.m.f. pulses are easier to detect and the resolution is improved.

Accordingly the present invention provides a device for detecting axial movement of a rotating member comprising a conducting wire spaced radially from the rotating member, the rotating member having at least one magnet which when rotating passes in proximity to the conducting wire producing a pulsed e.m.f. in the conducting wire each time the magnet crosses the conducting wire, the conducting wire having a first limb, a second limb and a third limb connected together and extending with axial and circumferential components, the first limb and the third limb extending in the circumferentially opposite direction to the second limb to increase the resolution between the pulses e.m.f.s produced when the at least one magnet crosses the first, second and third limbs, the time between the pulsed e.m.f.s changing and being indicative of the axial position of the rotating member, the first, second and third limbs of the conducting wire each comprising a pair of parallel connected bars to produce a positive and negative pulsed e.m.f. which form a zero crossing point each time a limb of the conducting wire is crossed by the at least one magnet, the zero crossing points being more capable of accurate detection.

The first limb and third limb may extend parallel to each other, and the first, second and third limbs may be angled at substantially 45° to the axis of rotation. The ends of the limbs may be spaced circumferentially to reduce overlapping and cancelling of the pulsed e.m.f.s from adjacent limbs.

The rotating member may be a rotor of an axial flow compressor or turbine, the at least one magnet being mounted in the tip of one of the blades of the rotor and being at least in part surrounded by the conducting wire.

The present invention will be more fully described by way of reference to the accompanying drawings, in which.

Figure 1:
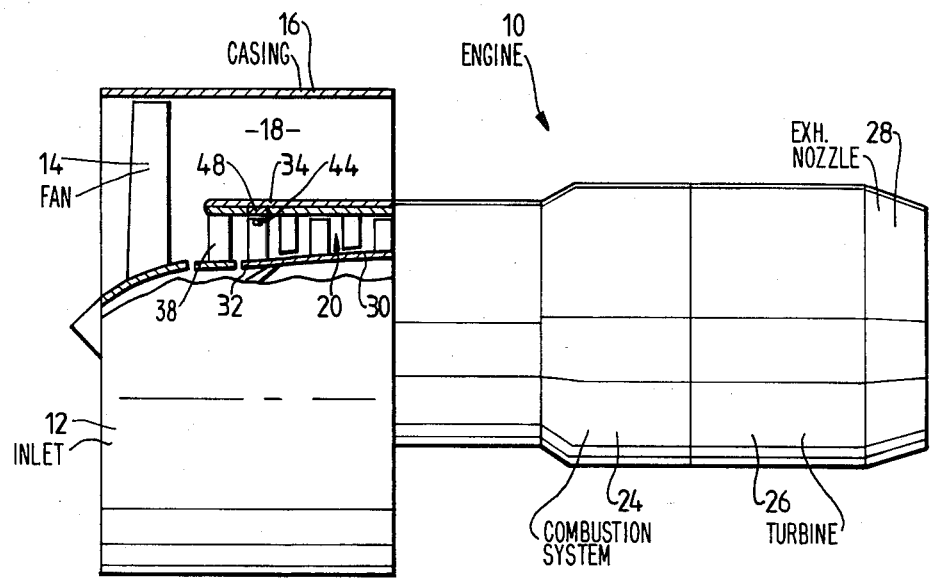
FIG. 1 is a partially cut-away view of a gas turbine engine showing a device for detecting axial movement of a rotating member according to the present invention.

A gas turbine engine 10 is shown in FIG. 1 and comprises in flow series an inlet 12, a fan 14, a compressor 20, a combustion system 24, a turbine 26 and an exhaust nozzle 28. A fan casing 16 surrounds the fan 14 and forms a bypass duct 18 with a portion of the outer casing 34 of the compressor 20. The compressor 20 comprises a rotor 30 carrying several axially spaced stages of rotor bades 32. The stator vanes 38 are attached to the inner casing 36. The stages of blades 32 and vanes 38 being arranged axially alternately.

Figure 2:
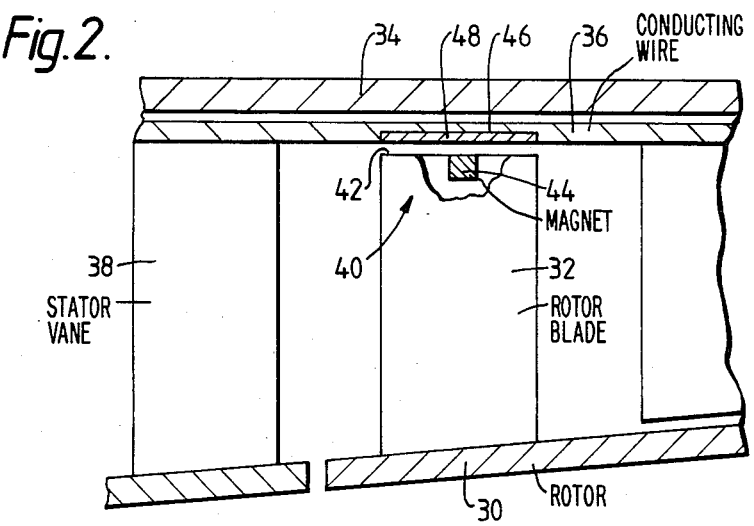
FIG. 2 is an enlarged sectional view of part of the compressor of the gas turbine engine shown in FIG. 1 and the device for detecting axial movement of a rotating member comprising a magnet and a conducting wire.

A device 40 to detect axial movement of the rotor 30 comprises a magnet 44 mounted in the tip 42 of one of the rotor blades 32, and a conducting wire 48 spaced radially from the tip 42 of the rotor blades 32 and positioned within an annular groove 46 formed on the inner surface of the inner casing 36, as seen in FIG. 2.

Figure 3:
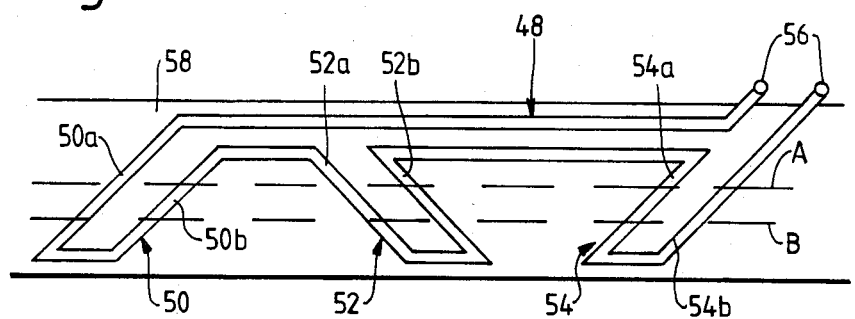
FIG. 3 is a plan view of a conducting wire for use in the device for detecting axial movement of a rotating member.

The conducting wire 48 is shown more clearly in FIG. 3 and comprises a first limb 50, a second limb 52 and a third limb 54 which are connected in series and which extend with axial and circumferential components. As can be seen the first limb 50 and the third limb 54 extend in the opposite circumferential direction to the second limb 52, and the first and third limbs are parallel, although this need not be so. Each of the three limbs is formed from a pair of parallel bars 50a, 50b, 52a, 52b and 54a, 54b respectively which are connected in series to each other at one end. The conducting wire has output terminals 56 taken from the limbs 50 and 54.

The conducting wire is laid on or in an insulating material 58, for example a copper track of required shape could be formed on a copper covered polyimide film, such as Kapton (Tradename of Dupont), using printed circuit board technology i.e. by etching away undesired copper from the polyamide film. The copper track could then be covered with a further layer of polyamide film, and the polyamide film with the copper track can be fixed in the annular grooves 46, in the inner casing 36 using an epoxy adhesive, such as M-Bond 610 (Tradename) or other suitable adhesive. The annular grooves could be formed in abradeable linings in the inner casing. A glass reinforced plastic circuit board, or any other suitable insulating material could be used instead of the polyamide film, and any suitable electrically conducting material could be used to form the conducting wire. The polyamide and epoxy adhesive were chosen because they perform satisfactorily at temperatures upto 350° C., these temperatures being encountered in the compressor of a gas turbine engine.

Figure 4:
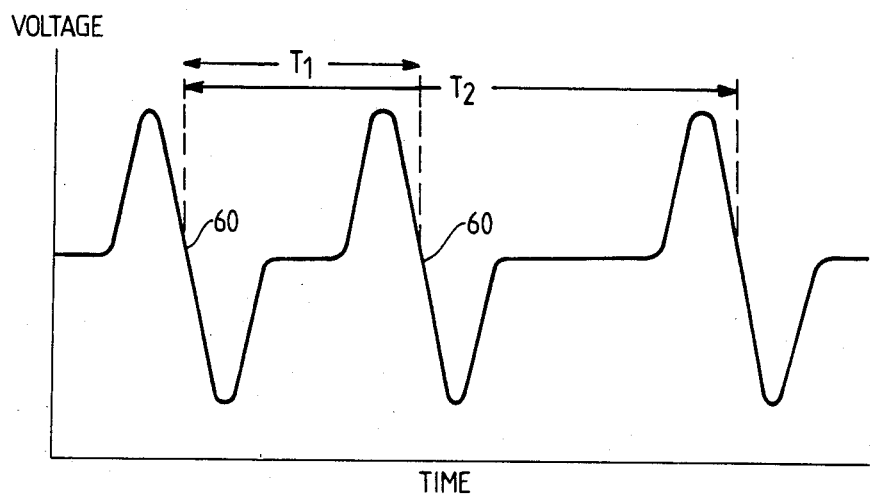
FIGS. 4 and 5 show graphs of voltage against time for the output of the conducting wire, or a typical output signal as seen on an oscilloscope.

In operation as the compressor rotor rotates, the magnet 44 positioned in the tip 42 of one of the blades 32 passes in proximity to the conducting wire 48 producing a pulsed e.m.f. in the conducting wire each time the magnet crosses the conducting wire. The magnet crosses the limbs 50,52 and 54 consecutively, each time the magnet crosses a limb it crosses the two respective bars to produce a positive and a negative pulsed e.m.f. These positive and negative pulses e.m.f.s combine together to produce a zero crossing point 60 between them as shown in FIG. 4. The zero crossing points are very much easier to detect, either visually on an oscilloscope or electronically than single pulses of e.m.f.

If the rotor remains fixed axially, the magnet follows a path A, for example, and an output signal supplied from the output terminals to an oscilloscope would appear as shown in FIG. 4. The pulsed e.m.f.s and zero crossing points from each limb remain at a fixed time interval between each other when the engine is running at constant speed. The time interval between the zero crossing point from the first limb and the zero crossing point from the second limb is T, and the time interval between the zero crossing point from the first limb and the zero crossing point from third limb is T2.

Figure 6:
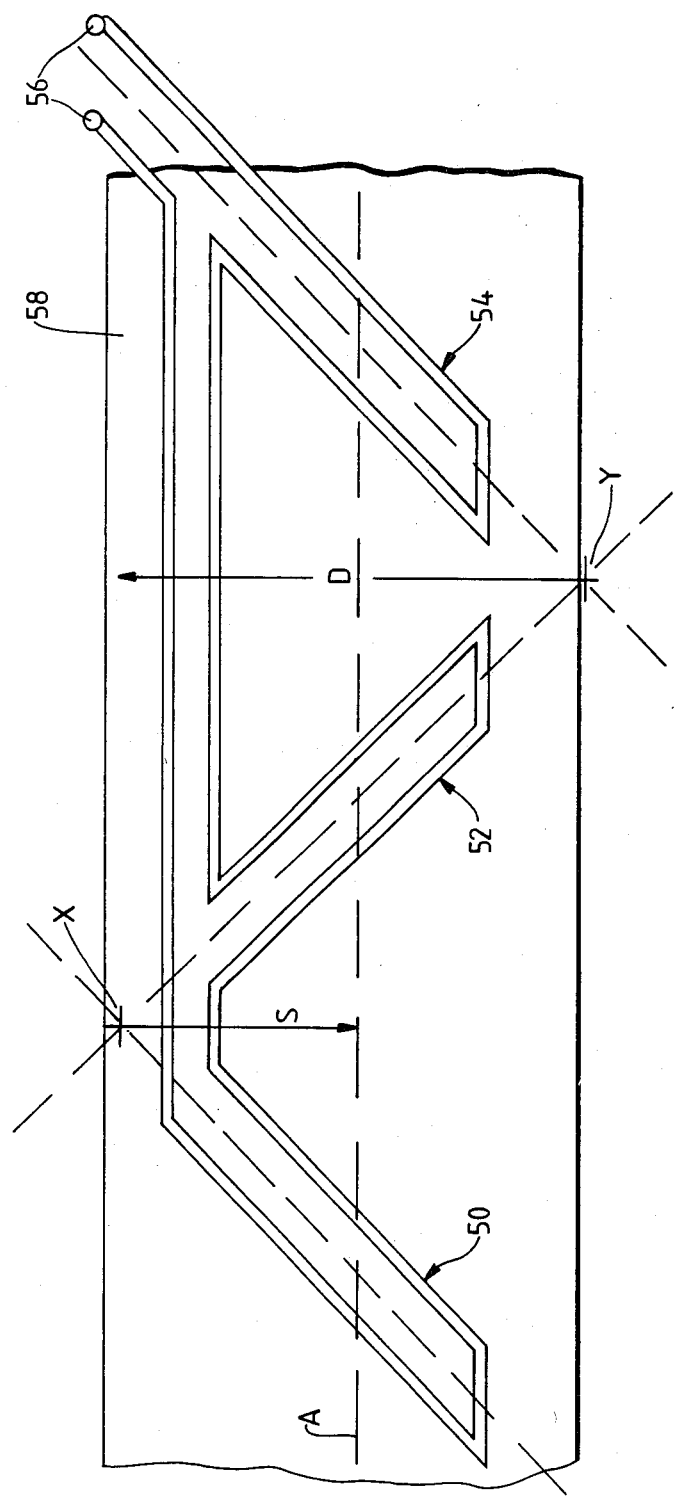
FIG. 6 is an enlarged plan view of the conducting wire.

From the geometry of the conducting wire the axial width of the conducting wire is D and the axial position of the magnet following path A will be S as seen in FIG. 6. The width D is found by extrapolating the centre lines of limbs 50,52 and 54 until they cross at points X and Y, and D is the axial distance between the cross over points.

The axial position of the magnet is found from the equation $T1/T2 \times D = S$.

This is valid in the centre of the wire, but ceases to be valid at the edges, when it is necessary to use calibration techniques.

Because the limbs are angled at 45° to the axial direction, S is a measure of the axial position of the magnet and rotor in relation to the top of the conducting wire as shown.

Figure 5:
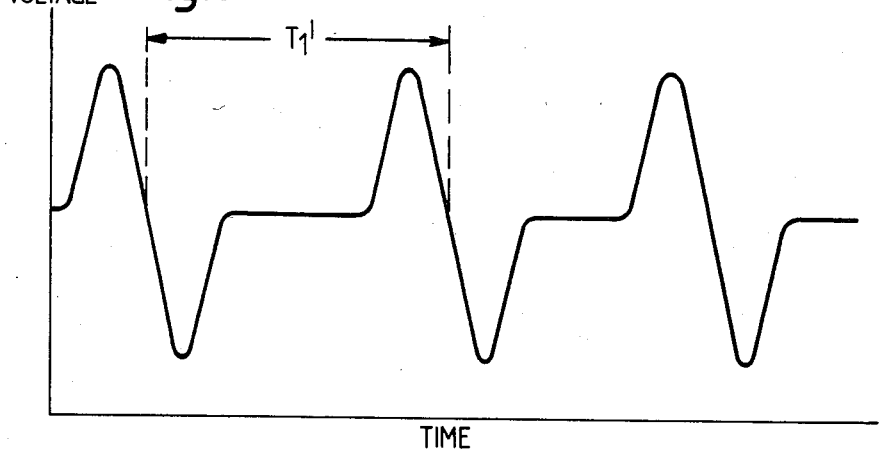

If the rotor moves axially, the magnet follows another path, path B for example as shown in FIG. 3, and an output signal as supplied from the output terminals would appear as in FIG. 5 on an oscilloscope. The time interval T2 remains the same, but the time interval between the zero crossing point from the first limb and the zero crossing point from the second limb changes to T1'. To obtain the new axial position of the magnet and rotor T1' is substituted for T1 in the above equations.

The limbs 50,52 and 54 are all angled at the same angle to the rotor axis to obtain pulsed e.m.f.s of equal amplitude, and the first and third limbs are angled in the opposite direction to the second limb so that the pulsed e.m.f.s from the first and third limbs vary in time with the axial position of the magnet, in the opposite sense to the pulsed e.m.f. from the second limb, which doubles the resolution.

The choice of angle for the limbs is a trade off between theoretical resolution and pulse detection. As the angle of the limbs to the rotor axis increases the resolution increases but the pulsed e.m.f.s become broader and more difficult to detect, 45° is a compromise between the two.

The output terminals of the conducting wire can be connected to an amplifier which produces an amplified signal which can be displayed on an oscilloscope to produce a trace similar to those shown in FIGS. 4 and 5. The signal need not be filtered as is required in the prior art.

The zero crossing points can be detected electronically and digital pulses produced, these can be fed to timers and a microprocessor, can then be used to calculate the axial position of the magnet from a suitable datum as described earlier.

The device for detecting axial movement of a rotating member as described has several advantages over the prior art. The device produces zero crossing points which are easier to detect and more accurate than a peak, and also allows the use electronic devices to detect the zero crossing points. The angling of limbs in opposite directions increases the resolution of the device. The improved detection of the zero crossing points allows the use of the device at greater radial clearances, and therefore reduces the chances of damage to the strip, or the device could be used when the rotational speed of the rotor is relatively low. At low rotational speeds the e.m.f. pulses produced by the passing magnet fall to less than 10 $\mu$V, but detection of zero crossing points is still possible, and at present the signal processing equipment limits the lower speed limit to 160 revolutions per minute.

I claim:

1. A device for detecting axial movement of a rotating member comprising a conducting wire spaced radially from the rotating member, the rotating member having at least one magnet which when rotating passes in proximity to the conducting wire producing a pulsed e.m.f. in the conducting wire each time the magnet crosses the conducting wire, the conducting wire having a first limb, a second limb and a third limb electrically connected together in series and extending with axial and circumferential components, the first limb and third limb extending in the circumferentially opposite direction to the second limb to increase the resolution between the pulsed e.m.f.'s produced when the at least one magnet crosses the first, second and third limbs, the time between the pulsed e.m.f.'s changing and being indicative of the axial position of the rotating member, the first, second and third limbs of the conducting wire each comprising a pair of parallel connected bars to produce positive and negative pulsed e.m.f.'s which form a zero crossing point each time a limb of the conducting wire is crossed by the at least one magnet, the zero crossing points being more capable of accurate detection.

2. A device for detecting axial movement of a rotating member as claimed in claim 1 in which the first limb and third limb extend parallel to each other.

3. A device for detecting axial movement of a rotating member as claimed in claim 1 in which the first, second and third limbs are angled at substantially 45° to the axis of rotation.

4. A device for detecting axial movement of a rotating member as claimed in claim 1 in which the ends of the limbs are spaced circumferentially to reduce overlapping and cancelling of the pulsed e.m.f.'s from the adjacent limbs.

5. A device for detecting axial movement of a rotating member as claimed in claim 1 in which the rotating member is the rotor of an axial flow compressor or turbine, the at least one magnet being mounted in the tip of one of the blades of the rotor and being at least in part surrounded by the conducting wire.

* * * * *